United States Patent Office 3,127,443
Patented Mar. 31, 1964

3,127,443
DECOLORIZATION OF AMINO ACIDS
Roger N. Sargent, Midland, Mich., assignor to The Dow Chemical Company, Midland, Mich., a corporation of Delaware
No Drawing. Filed Nov. 21, 1958, Ser. No. 775,371
7 Claims. (Cl. 260—534)

This invention concerns a method for decolorizing aminocarboxylic acids which are prepared by the amination of halocarboxylic acids, wherein certain strongly basic anion-exchange resins are used as decolorizing agents.

Aminocarboxylic acids, including alkyl- and aryl-substituted aminocarboxylic acids, hereinafter referred to as aminocarboxylic acids, are prepared by reacting halocarboxylic acids with ammonia or amines, and the resulting aminocarboxylic acids are separated from by-product salts in the crude reaction mixture and are purified. In the chemical reaction, darkly colored by-products are formed which can be removed to a limited extent with activated charcoal.

It has now been discovered that the desalted crude aminocarboxylic acids prepared by amination of halocarboxylic acids can be substantially decolorized by contacting their aqueous solutions with certain strongly basic anion exchange resins. Thereby such crude aminocarboxylic acids as those of glycine, alanine, valine, leucine, isoleucine, serine, threonine, cysteine, cystine, methionine, proline, hydroxyproline, citrulline, iminodiacetic acid, sarcosine and the like can be decolorized.

The decolorization as practiced in this invention is advantageously performed by contacting the desalted crude aminocarboxylic acid solutions with, advantageously by passing them through, a bed of certain strongly basic anion exchange resins in the salt form, e.g., the chloride form.

The strongly basic anion exchange resins useful as decolorizing agents in the practice of this invention are the well-known quaternary ammonium types which have a cross-linked polystyrene matrix to which are attached trialkylbenzyl-ammonium groups, dialkylalkanolbenzyl-ammonium groups, or alkyldi(hydroxyalkyl)benzylammonium groups, e.g., those having a styrene-divinylbenzene matrix and attached trimethylbenzylammonium, dimethylethanol benzylammonium, methyldi(hydroxyethyl)benzylammonium and homologous groups, and the polymeric crosslinked vinylbenzyl sulfonium types, hereinafter also referred to as sulfonium types, such as are described and claimed in copending U.S. patent application Serial No. 769,545, filed October 27, 1958, and now abandoned, which have alkyl and/or hydroxyalkyl or polymethylene groups attached to the sulfonium sulfur atom, wherein the alkyl groups contain from 1 to 4 carbon atoms, the hydroxyalkyl groups contain from 2 to 4 carbon atoms, and the polymethylene groups contain from 4 to 12 carbon atoms, from 4 to 8 of which are polymethylene carbon atoms, the balance being from one or more alkyl substituents. Their prototype is poly(vinylbenzyl dimethylsulfonium) chloride. Generally, the amount of crosslinking can be varied between about 0.5 to 24 weight percent, but preferably crosslinking up to about 8 weight percent is preferred both for high capacity and porosity.

It is not necessary that the aminocarboxylic acid solution be of any particular concentration, but concentrations near saturation are desirable from an economic standpoint. Any convenient temperature can be used above the freezing point and below the boiling point of water. In an ion exchange column, the flow rate of the solution and the particle size of the resin can be varied as desired. Decolorization is advantageously performed at flow rates of 1 to 2 gal./min./sq. ft. of bed, preferably at elevated temperatures of ca. 50°–75° C. with porous resins of fine mesh, such as 50 to 100 mesh.

As the decolorization of the crude aminocarboxylic acid solution proceeds, the anion exchange resin changes in color from a light tan to a dark brown. When the capacity of the resin for color removal is exhausted, it is regenerated by the passage of aqueous sodium chloride, advantageously about 20 weight percent, at a slow flow rate and an elevated temperature ca. 50°–75° C. Periodically, dilute aqueous sodium hypochlorite up to about 5 weight percent may be used to remove irreversibly sorbed color bodies from the resin.

The decolorized aqueous solution of aminocarboxylic acid is separated from the resin, advantageously as the eluate from a column of resin, and the aminocarboxylic acid is recovered in the usual manner, advantageously by precipitation with methanol and drying.

The following examples describe specific embodiments of the invention.

EXAMPLE 1

Crude aqueous alanine solution, after removal of ammonium chloride and concentration to approximately 25 weight percent solids, was passed through a 10 ml. bed of a strongly basic anion exchange resin, Dowex 2–X8, 50–100 mesh, chloride form (a resin having dimethylethanolbenzylammonium groups on a 92 percent styrene–8 percent divinylbenzene matrix, see U.S. Patent No. 2,614,099), at 65° C. at a flow rate of 3 gal./min./sq. ft. Fractions of eluate were collected and compared with the color of the feed solution, as follows in Table I. Similar comparisons were made with alanine which was precipitated from aliquots of some of the fraction.

Table I.—Decolorization of Alanine

| Cut No. | Accumulative Feed Volume, ml. | APHA Color [a] of Eluate | APHA Color of Ppt'd Alanine |
|---|---|---|---|
| Feed | | (445) | 100. |
| 1 | 250 | 100 | <5. |
| 2 | 500 | 167 | not determined. |
| 3 | 750 | 200 | Do. |
| 4 | 1,000 | 245 | Do. |
| 5 | 1,500 | 250 | 20–. |
| 6 | 3,000 | 300 | not determined. |

[a] Am. Pub. Health Assn. Stds., 1946, p. 14.

Table I shows that the color of the alanine, precipitated from the eluate, was greatly reduced by treatment with the resin. A reduction in the color from 100 to less than 20 for the precipitated alanine was obtained by the pasage of 1500 ml. (150 bed volumes) of the 25 weight percent alanine concentrate. This represents about 310 moles of alanine decolorized per mole of resin. During the decolorization, the color of the resin changed from a light tan to a dark brown. When the capacity of the resin for color removal was exhausted, it was regenerated by the passage of 35 ml. of 20 percent aqueous sodium chloride at 65° C. at a flow rate of 0.2 gal./min./sq. ft.

EXAMPLE 2

An aqueous 30 percent glycine concentrate (APHA color=490), after removal of ammonium chloride, was passed through a 13.5 ml. bed of Dowex 1, an anion exchange resin having trimethylbenzylammonium functional groups on a 92 percent styrene–8 percent divinylbenzene matrix, 20–50 mesh, chloride form, at room temperature and at a flow rate of 2 gal./min./sq. ft. A total of 1350 ml. of concentrate was treated. The eluate was collected and the APHA color was determined to be 182. After regeneration with 53 ml. of aqueous 20 weight percent sodium chloride at 65° C. and 0.2 gal./min./sq. ft. and backwashing with water, another 1350 ml. of glycine concentrate was fed to the bed. The APHA color of its eluate was 195.

EXAMPLE 3

A desalted, approximately 25 weight percent glycine aqueous concentrate was passed through 10 ml. beds of various decolorizers as shown in Table II at room temperature and a flow rate of 2 gal./min./sq. ft. Fifty bed volumes (500 ml.) of glycine concentrate were passed through each bed. The eluate and in some cases the glycine precipitated therefrom were analyzed for APHA color (APHA in the table).

*Table II.—Comparison of Various Decolorizers*

| Decolorizer | None | 1[a] | 2[b] | 3[c] | 4[d] | 5[e] | 6[a] | 7[f] | 8[g] |
|---|---|---|---|---|---|---|---|---|---|
| APHA, feed | 1120 | 1120 | 1120 | 1120 | 1120 | 820 | 820 | 820 | 820 |
| APHA, eluate | | 160 | 325 | 1200 | 510 | 820 | 106 | 127 | 320 |
| APHA, ppt'd glycine | 74 | 13 | 37 | 71 | 45 | not determined | | | |

[a] Dowex 2-X8, 50-100 mesh, chloride form, as defined in Example 1.
[b] Sulfonium-X8, 50-100 mesh, chloride form, poly(vinylbenzyldimethylsulfonium chloride).
[c] Permutit SK, 20-50 mesh, chloride form, a pyridinium-quaternary ammonium anion exchange resin.
[d] Pittsburgh activated charcoal, type CAL, 12-40 mesh.
[e] Dowex 3, 20-50 mesh, free base form anion exchange resin, weakly basic polyamine anion exchange groups on a crosslinked polystyrene matrix.
[f] Dowex 21K, 50-100 mesh, chloride form anion exchange resin having trialkylbenzylammonium groups on a crosslinked polystyrene matrix.
[g] Dowex 1-X8, 50-100 mesh, chloride form, as defined in Example 2.

The data in Table II show that certain strongly basic anion exchangers are superior to charcoal and to other anion exchange resins in their capacity to remove color bodies from desalted aqueous crude aminocarboxylic acid solutions. A further advantage of the resins is that they can be readily regenerated with aqueous sodium chloride and reused.

EXAMPLE 4

An aqueous desalted solution approximately 1.53 weight percent monoammonium iminodiacetic acid and 0.26 weight percent glycine was passed through a 10 ml. bed of a strongly basic anion exchange resin (reference ([a]) in Example 3). The same solution was also passed through a 10 ml. bed of charcoal (reference ([d]) in Example 3). One hundred bed volumes (1000 ml.) of the solution were used for each decolorization at room temperature and a flow rate of 2 gal./min./sq. ft. The APHA color of the eluate was determined. Glycine was removed from the eluate and the monoammonium iminodiacetate was converted to iminodiacetic acid (IDA), concentrated, and precipitated by the addition of methanol. The APHA color of the precipitate was determined. These data are given in Table III.

*Table III.—Decolorization of Iminodiacetic Acid*

| Decolorizer | None | Anion Exchange Resin [a] | Charcoal [b] |
|---|---|---|---|
| APHA, feed | 210 | 210 | 210 |
| APHA, eluate | | 17 | 50 |
| APHA, ppt'd IDA | 20 | <5 | 10 |

[a] Reference ([a]) in Example 3.
[b] Reference ([d]) in Example 3.

The breakthrough of the color bodies present in the feed was observed in the eluate of the charcoal bed after the passage of about 35 bed volumes of feed. The darkly colored band in the bed of the anion exchange resin, however, had only moved approximately 60 percent down the bed after the passage of an equal amount of feed.

What is claimed is:
1. A method for decolorizing an amino acid prepared by aminating a halocarboxylic acid wherein colored by-products are formed, which method comprises contacting an aqueous desalted solution of said amino acid with a strongly basic anion exchange resin of the quaternary ammonium and sulfonium types and separating a substantially decolorized amino acid solution therefrom.
2. The method of claim 1, wherein the amino acid is glycine.
3. The method of claim 1, wherein the amino acid is alanine.
4. The method of claim 1, wherein the amino acid is iminodiacetic acid.
5. The method of claim 1, wherein the anion exchange resin has a crosslinked polystyrene matrix to which are attached trialakylbenzylammonium functional groups.
6. The method of claim 1, wherein the anion exchange resin has a crosslinked polystyrene matrix to which are attached dimethylhydroxyethylbenzylammonium groups.
7. The method of claim 1, wherein the anion exchange resin has a crosslinked polystyrene matrix to which are attached $-S^+R_1R_2$ functional groups wherein $R_1$ and $R_2$ individually represent alkyl groups having 1 to 4 carbon atoms and hydroxyalkyl groups having 2 to 4 carbon atoms and together represent a polymethylene group containing from 4 to 12 carbon atoms from 4 to 8 of which are polymethylene carbon atoms, the balance being from alkyl substituents.

References Cited in the file of this patent

UNITED STATES PATENTS

| | | |
|---|---|---|
| 2,163,593 | Engels et al. | June 27, 1939 |
| 2,478,047 | Johnson | Aug. 2, 1949 |
| 2,561,695 | Gustafson | July 24, 1951 |
| 2,597,494 | Hwa | May 20, 1952 |
| 2,646,171 | Weiss | July 21, 1953 |
| 2,839,548 | Berther et al. | June 17, 1958 |

OTHER REFERENCES

Knight: "Nature," vol. 188 (1960), pages 739–740.